US008459885B2

(12) United States Patent
Min

(10) Patent No.: US 8,459,885 B2
(45) Date of Patent: Jun. 11, 2013

(54) CLOCK FACE KEYBOARD

(76) Inventor: Byung Kon Min, Palo Alto, CA (US)

( * ) Notice: Subject to any disclaimer, the term of this patent is extended or adjusted under 35 U.S.C. 154(b) by 570 days.

(21) Appl. No.: 12/798,306

(22) Filed: Mar. 31, 2010

(65) Prior Publication Data

US 2010/0266323 A1 Oct. 21, 2010

Related U.S. Application Data

(63) Continuation-in-part of application No. 11/581,303, filed on Oct. 16, 2002, now abandoned.

(60) Provisional application No. 60/726,932, filed on Oct. 15, 2005, provisional application No. 60/777,069, filed on Feb. 27, 2006.

(51) Int. Cl.
*B41J 5/10* (2006.01)
*G06F 3/02* (2006.01)

(52) U.S. Cl.
USPC ............................. 400/472; 400/486; 400/489

(58) Field of Classification Search
CPC .................................. B41J 5/10; G06F 1/1664
USPC .................... 400/472, 486, 489; 379/433.01, 379/433.07
See application file for complete search history.

(56) References Cited

U.S. PATENT DOCUMENTS

| | | | |
|---|---|---|---|
| 2,040,248 A | 5/1936 | Dvorak et al. | |
| 3,778,819 A | 12/1973 | Bhagawan et al. | |
| 4,404,547 A | 9/1983 | Zybailo et al. | |
| 4,522,518 A | 6/1985 | Schmidt | |
| 4,633,227 A | 12/1986 | Menn | |
| 4,661,005 A | 4/1987 | Lahr | |
| 4,754,268 A | 6/1988 | Mori | |
| 4,762,436 A | 8/1988 | Herzog et al. | |
| 4,795,349 A | 1/1989 | Sprague et al. | |
| 4,855,746 A | 8/1989 | Stacy | |
| 4,913,573 A | 4/1990 | Retter | |
| 5,003,301 A | 3/1991 | Romberg | |

(Continued)

FOREIGN PATENT DOCUMENTS

| | | |
|---|---|---|
| CN | 1110810 A | 10/1995 |
| CN | 1572058 A | 1/2005 |

(Continued)

OTHER PUBLICATIONS

Brian B.K. Min (legal name: Byung Kon Min), The performance of the mobile clock face QWERTY keyboard, draft publication dated Sep. 28, 2011.

*Primary Examiner* — Judy Nguyen
*Assistant Examiner* — Jennifer Simmons

(57) ABSTRACT

A compact alphanumeric keyboard providing the clock face familiarity for ease of learning and ease of use, with at least twenty eight alphanumeric keys, where the keys are arranged in a first set of twelve keys, a second set of twelve keys, and a third set of four alphanumeric keys. The first set and second set of keys are arranged to correspond with positions of a set of twelve hours on a clock face and the first set, second set, and third set are concentric with respect to a center, where the ratio of the radii of the first bounding circle, second bounding circle, and third bounding circle is substantially square root of seven, two, and one so that each of the plurality of key areas have substantially of equal area. Each of the at least twenty-eight alphanumeric keys has an indicia surface for being comfortably pressed by a finger.

20 Claims, 12 Drawing Sheets

U.S. PATENT DOCUMENTS

| | | | |
|---|---|---|---|
| 5,003,503 | A | 3/1991 | Lapeyre |
| 5,062,070 | A | 10/1991 | Lapeyre |
| 5,129,747 | A | 7/1992 | Hutchison |
| 5,137,384 | A | 8/1992 | Spencer et al. |
| 5,166,669 | A | 11/1992 | Romberg |
| 5,184,315 | A | 2/1993 | Lapeyre |
| 5,280,276 | A | 1/1994 | Kwok |
| 5,311,210 | A | 5/1994 | O'Brien et al. |
| 5,360,280 | A | 11/1994 | Camacho et al. |
| 5,388,154 | A | 2/1995 | Solomon |
| 5,426,449 | A | 6/1995 | Danziger |
| 5,457,479 | A | 10/1995 | Cheng |
| 5,457,480 | A | 10/1995 | White |
| 5,458,425 | A | 10/1995 | Torok |
| 5,479,163 | A | 12/1995 | Samulewicz |
| 5,497,151 | A | 3/1996 | Dombroski |
| 5,500,643 | A | 3/1996 | Grant |
| 5,553,953 | A | 9/1996 | Herman et al. |
| 5,563,631 | A | 10/1996 | Masunaga |
| 5,583,541 | A | 12/1996 | Solhjell |
| 5,596,480 | A | 1/1997 | Manser et al. |
| 5,605,406 | A | 2/1997 | Bowen |
| 5,626,429 | A | 5/1997 | Choate |
| 5,646,648 | A | 7/1997 | Bertram |
| 5,646,817 | A | 7/1997 | Manser et al. |
| 5,660,488 | A | 8/1997 | Miller |
| 5,675,329 | A | 10/1997 | Barker et al. |
| 5,700,097 | A | 12/1997 | Kuhlenschmidt |
| 5,701,123 | A | 12/1997 | Samulewicz |
| 5,707,160 | A | 1/1998 | Bowen |
| 5,716,149 | A | 2/1998 | Mensick |
| 5,724,106 | A | 3/1998 | Autry |
| 5,767,841 | A | 6/1998 | Hartman |
| 5,790,103 | A | 8/1998 | Willner |
| 5,798,715 | A | 8/1998 | Saperstone |
| 5,831,555 | A | 11/1998 | Yu |
| 5,841,374 | A | 11/1998 | Abraham |
| 5,854,621 | A | 12/1998 | Junod |
| 5,923,757 | A | 7/1999 | Hocker |
| 5,936,555 | A | 8/1999 | Zagnoev |
| 5,949,401 | A | 9/1999 | Kazarian |
| 5,959,557 | A | 9/1999 | Lim |
| 5,971,636 | A | 10/1999 | Mensick |
| 5,973,757 | A | 10/1999 | Aubuchon et al. |
| 5,990,868 | A | 11/1999 | Frederick |
| 6,040,820 | A | 3/2000 | Choi |
| 6,042,282 | A | 3/2000 | Camacho et al. |
| 6,053,647 | A | 4/2000 | Parkinson |
| 6,078,789 | A | 6/2000 | Bodenmann |
| 6,088,022 | A | 7/2000 | Rakoski |
| 6,111,527 | A | 8/2000 | Susel |
| 6,121,960 | A | 9/2000 | Carroll et al. |
| 6,132,118 | A | 10/2000 | Grezeszak |
| 6,173,194 | B1 | 1/2001 | Vanttila |
| 6,184,869 | B1 | 2/2001 | Harding |
| 6,198,474 | B1 | 3/2001 | Roylance |
| 6,208,384 | B1 | 3/2001 | Schultheiss |
| 6,313,851 | B1 | 11/2001 | Matthews et al. |
| 6,359,838 | B1 | 3/2002 | Taylor |
| 6,443,643 | B1 | 9/2002 | Camacho et al. |
| 6,466,154 | B1 | 10/2002 | Kim et al. |
| 6,467,979 | B2 | 10/2002 | Camacho et al. |
| 6,657,560 | B1 * | 12/2003 | Jung ............................ 341/22 |
| 6,661,404 | B1 | 12/2003 | Sirola et al. |
| 6,696,985 | B2 | 2/2004 | Houston |
| 6,703,963 | B2 | 3/2004 | Higginson |
| 6,712,535 | B2 | 3/2004 | McLoone et al. |
| 6,731,227 | B2 | 5/2004 | Horie |
| 6,734,809 | B1 | 5/2004 | Olodort et al. |
| 6,756,969 | B2 | 6/2004 | Nuovo et al. |
| 6,839,002 | B2 | 1/2005 | Olodort et al. |
| 6,840,690 | B2 | 1/2005 | Camacho et al. |
| 6,847,310 | B1 | 1/2005 | Gill et al. |
| 6,854,906 | B2 | 2/2005 | Mandel |
| 6,867,965 | B2 | 3/2005 | Khoo |
| 6,869,239 | B2 | 3/2005 | Morris |
| 6,877,919 | B2 | 4/2005 | Sitalasai et al. |
| 6,883,984 | B2 | 4/2005 | McLoone et al. |
| 6,891,528 | B2 | 5/2005 | Houston |
| 6,891,529 | B2 | 5/2005 | Ladouceur et al. |
| 6,894,626 | B2 | 5/2005 | Olodort et al. |
| 6,925,315 | B2 * | 8/2005 | Langford ............... 455/575.1 |
| 6,932,524 | B2 | 8/2005 | McLoone et al. |
| 6,939,067 | B2 | 9/2005 | McLoone et al. |
| 6,952,198 | B2 | 10/2005 | Hansen |
| 6,952,200 | B2 | 10/2005 | Sirola et al. |
| 6,954,355 | B2 | 10/2005 | Gerstner et al. |
| 6,985,069 | B2 | 1/2006 | Marmaropoulos |
| 7,000,188 | B1 | 2/2006 | Eustace |
| 7,002,553 | B2 | 2/2006 | Shkolnikov |
| 7,256,769 | B2 | 8/2007 | Pun et al. |
| 7,286,115 | B2 | 10/2007 | Longe et al. |
| 7,293,231 | B1 | 11/2007 | Gunn et al. |
| 7,312,410 | B2 * | 12/2007 | Griffin et al. ............. 200/5 A |
| 7,676,036 | B2 * | 3/2010 | Takasaki et al. ......... 379/433.07 |
| 2004/0185921 | A1 | 9/2004 | Tornaghi |
| 2006/0294273 | A1 | 12/2006 | Lee |
| 2007/0086825 | A1 | 4/2007 | Min |
| 2007/0250772 | A1 | 10/2007 | Milosevski |
| 2009/0189864 | A1 | 7/2009 | Walker et al. |

FOREIGN PATENT DOCUMENTS

| | | | |
|---|---|---|---|
| JP | 10-090442 A | | 4/1998 |
| KR | 94-24726 | | 11/1994 |
| KR | 97-65046 | | 12/1997 |
| KR | 10-0855448 B1 | | 9/2008 |
| WO | WO 2004/072837 A1 | | 8/2004 |
| WO | WO 2005041232 A1 | | 5/2005 |
| WO | WO 2006-057488 A2 | | 6/2006 |

* cited by examiner

| Key No. | Num Lk On | | Num Lk Off | |
| --- | --- | --- | --- | --- |
| | Shift Off | Shift On | Shift Off | Shift on |
| 1 | 1 | f1 | a | A |
| 2 | 2 | f2 | c | C |
| 3 | 3 | f3 | e | E |
| 4 | 4 | f4 | g | G |
| 5 | 5 | f5 | i | I |
| 6 | 6 | f6 | k | K |
| 7 | 7 | f7 | m | M |
| 8 | 8 | f8 | o | O |
| 9 | 9 | f9 | q | Q |
| 10 | 10 | f10 | s | S |
| 11 | # | f11 | u | U |
| 12 | * | f12 | : | . |
| 13 | ) | ] | b | B |
| 14 | . | > | d | D |
| 15 | $ | $ | f | F |
| 16 | : | } | h | H |
| 17 | " | ' | j | J |
| 18 | ₩ | \| | l | L |
| 19 | ? | ! | n | N |
| 20 | ; | { | p | P |
| 21 | % | % | r | R |
| 22 | , | < | t | T |
| 23 | ( | [ | v | V |
| 24 | & | ~ | @ | / |
| 25 | = | N/A | w | W |
| 26 | + | N/A | x | X |
| 27 | * | N/A | y | Y |
| 28 | − | _ | z | Z |
| 29 | Num Lk | | | |
| 30 | Enter | | | |
| 31 | Shift | | | |
| 32 | Back | | | |

*Figure 3*

CLOCK FACE KEYBOARD

CROSS-REFERENCE TO RELATED APPLICATIONS

This application is a continuation of the application "Circular Keyboard," application Ser. No. 11/581,303 filed on Oct. 16, 2006, which claims the benefit of provisional applications "Circular Keyboard," Application No. 60/726,932 filed on Oct. 15, 2005 and "Remote Input Device," Application No. 60/777,069 filed on Feb. 27, 2006, all by the present inventor.

FEDERALLY SPONSORED RESEARCH

Not Applicable

SEQUENCE LISTING OF PROGRAM

Not Applicable

FIELD OF THE INVENTION

The present invention relates to data entry keyboards for electronic instruments: more particularly to a space efficient, easy-to-use hand-held keyboard for small electronic devices, mobile phones, computers, Internet TVs, etc.

BACKGROUND OF THE INVENTION

Prior Art

Broadband communications are becoming essential part of people's lives. Broadband Internet is becoming available even to airplane passengers for entertainment or work during flight in their confined seats by use of portable, wireless devices. Thus, the need for portable, space saving full alphanumeric keyboard is increasing.

Furthermore, more and more people find information and entertainment over Internet on their computer screens or on their TV screens with increasing integration of computing and entertainment. The need for remote controlling computers, TVs, and set top boxes by use of full alphanumeric keyboard is increasing. It is recognized that most computer interface devices currently used in home or office are not suitable in a confined or remote environments.

The conventional keyboard for handheld electronic devices, such as mobile phones and personal digital assistants (PDAs), primarily uses numeric keys arranged in rows and columns. Typically, the same keys also provide input functions for alphabet letters when stroked multiple times. For example, most phones have keypads where the number 2 key is also used to type alphabet letters A, B, and C if stroked rapidly once, twice, and thrice, respectively, when in the alphabet mode. Thus, the number of key strokes one must apply to obtain a particular alphabet letter is two or more on the average. This is acceptable only for occasional use, but is too cumbersome for frequent use. To reduce the number of strokes in typing alphabet letters and other symbols, an increased number of keys are required. The need to place additional keys within a small footprint or area is increasing as devices become more sophisticated and more and more functions are built in.

The need for remote entry of full alpha-numeric data is increasing as the Internet and Internet Protocol TVs are fast becoming the preferred mode of entertainment delivery. More and more PCs are used for multi-media entertainment. Data entry and commands for PCs are usually performed by using full size keyboards. To find entertainment content from the Internet and watch them on a computer monitor from a distance, a hand held, compact keyboard that can perform the data entry and commands remotely becomes increasingly necessary.

A full function data entry device typically includes a QWERTY keyboard, a numeric keypad, dedicated and programmable function keys, and cursor control keys. An on-screen pointer (cursor) control means, such as a remote mouse or a button or touch pad integrated with the keyboard, is also provided. Various accessories, including mouse pads and wrist rests, are typically positioned on the work surface proximate to the keyboard. For the aforementioned hand-held devices, however, the placement of any full alphanumeric keyboards, such as the standard QWERTY keyboards along with numeric keypads, is prohibitive because of space limitations.

U.S. Pat. No. 7,312,410 to Griffin et al relates to a reduced QWERTY keyboard assembly 12 having fewer than the number of keys in a standard QWERTY keyboard. The keys 42, 62 of Griffin's rectilinear keyboard 12 are arranged in rows and columns and engage primary and secondary conductors, or engage primary, secondary and tertiary conductors, for indicating two or three "indicia." (Column 4, lines 29-54, column 7, lines 47 et seq.). Griffin et al is concerned with reducing the size of a rectangular QWERTY keyboard, particularly the width, to obtain a smaller rectangular QWERTY keyboard by reducing the number of physical keys while still allowing accurate typing with a common pattern, such as QWERTY.

U.S. Pat. No. 6,925,315 to Langford relates to a telephone handset 1 having a keypad 200 with a central fourway rocker switch 215 surrounded by ten numeric keys for numerals "0-9." (FIG. 2A, 2B; Column 7, lines 19-33, and column 8, line 57 to column 9, line 11). Langford is concerned with a telephone handset or a cell phone and has no need for additional keys beyond those shown. (Abstract; Column 6, lines 45-65).

U.S. Pat. No. 6,657,560 to Jung for a "Rounded Keypad" (herein "the Jung Patent" or "Jung") describes a rounded keypad operable with only one finger that has keys on three concentric rounded key groups or sets. Problems addressed by the Jung Patent include (1) that a conventional keyboard is not portable (Col. 1, Lines 27-37), and (2) that typing speed for a rounded/circular keypad is slow (Col. 1, Lines 45-53). To solve (1), Jung arranges the alphabet letters in the first (inner) and the second (outer) rounded sets. To solve (2), Jung arranges the alphabet letters of high using frequency in the first set which is within easier reach of the operator's finger and the alphabet letters of low using frequency in the second set (Claims 1 and 34). To solve (2) Jung also arranges the alphabet letters in alphabetical order (Claim 17). In various embodiments of the Jung Patent, the number of keys of the first inner set ranges from 8 to 16. The number of keys of the second outer set is no less than 14 and up to 20.

Although the Jung Patent solutions are quite effective on both problems, one of the drawbacks of Jung's solutions is the lack of familiarity of the key layout to most people. For instance the standard QWERTY keyboard layout is familiar to most people. Furthermore the clock face is familiar to most people. A familiarity is an important element that promotes ease of learning and ease of use.

The present invention not only improves upon prior art for both Problem (1) portability and Problem (2) typing efficiency, it also improves for familiarity of the keyboard layout hence ease of learning and ease of use as will become clear in the next section.

A class of smart phones are now equipped with an integrated mini QWERTY keyboard which is operated with one hand and one finger of the other hand, with one hand and the thumb of the same hand, or with two hands with two thumbs. To accommodate the substantially rectilinear form factor of the integrated mini QWERTY keyboard, some smart phones are designed to be wider than traditional mobile phones.

The mini QWERTY keyboard adds substantially to the size and weight of the mobile phones, a crucial penalty for the handsets that fetch premium values for small size and low weight. Another penalty of the integrated mini QWERTY keyboard is that the numeric keypad is now overlaid on small alphabet keys, significantly compromising the main function of the handsets, i.e., making phone calls.

This size and weight problem has been proven to be extremely difficult to solve. Although numerous other input systems have been proposed, people have been reluctant to learn any input system that they are not familiar with or is time-consuming to learn. Some handsets now have only an on-screen keyboard and many people find them to be less productive than those having a hard keyboard they can feel and press. The present invention attempts to provide handset users with a solution to the above problems.

A novel feature of the present invention is to apply the clock face geometry to a full alphabet keyboard design for portability, efficiency, ease of learning, and ease of use.

The keyboard recited in the claims of the present invention provides a unique, new and non-obvious dual clock face keyboard configuration that is much more than a "mere rearrangement of parts." It is this new keyboard configuration that provides advantages, such as (1) familiarity due to the circular clock face configuration of both the inner and outer circles of keys, (2) ease of use for a user unfamiliar with the keyboard, and (3) further advantage owing to the claimed arrangements of alphabet keys thereon to assist the user to quickly learn over prior art keyboards. It is an inventive keyboard configuration. In addition, the Min US2007/00868825A1 claims also recite a unique and non-obvious arrangement of alphabetic characters.

Keyboard configurations and arrangements described in various issued US Patents have been patented, including, for example:

(a) U.S. Pat. No. 5,129,747 to Hutchinson (of record) shows a rectangular keyboard configured with V-shaped rows, nested so as to generally form a chevron. Three V-shape rows have 10, 9, and 7 alphabet keys, respectively, for a total of 26 with each row having an easily recognizable left end key and right end key. "The actual content (or "symbol set") of these four rows is arranged in the same left-to-right order as the prominent QWERTY keyboard set." (Col. 6, lines 5-7). "The present [Hutchinson] invention provides a chevron-shaped QWERTY keyboard that otherwise seem to be very little changed from the point of view of a QWERTY-trained operator." (Col. 3, lines 19-22). The instant [Hutchinson] keyboard is so ergonomically efficient as to reduce the fatigue and discomfort which leads in present designs to errors and injury. It increases comfort, typing speed and accuracy." (Col. 3, lines 26-29).

(b) U.S. Pat. No. 5,166,669 to Romberg (of record) discloses an improved key arrangement with the keys arranged to accommodate increased speed, and to facilitate learning by someone already familiar with the standard QWERTY key arrangement (from Abstract). It is an object of the Romberg invention "to provide an improved key arrangement which facilitates increases in typing speed while maintaining many of the keys in the same position as the Qwerty key arrangement, or a position close to that in the Qwerty key arrangement. By so maintaining many of the keys in the same position, the amount of training required to learn to use the new key arrangement is minimized." (Col. 2, lines 48-54).

(c) U.S. Pat. No. 2,040,248 to Dvorak et al (Exhibit A hereto) discloses an invention "related to the spatial arrangement of keys in a typewriter keyboard. It has for its general objects (1) the provision of a scientific plan of arranging the keys which will decrease the possibility of typewriting errors, (2) facilitating increase of operating speed by eliminating awkward sequences, (3) assisting increase of speed because of fewer errors, (4) lessening the fatigue of the typist, because of fewer interruptions due to errors, because of better arrangement of the keys for typing the sequences most frequently used, and the rhythmical flow of typing induced thereby, and because of more evenly distributed labor for the individual fingers and the two hands." (Col. 1, lines 1-15).

(d) U.S. Pat. No. 6,053,647 to Parkinson (Exhibit B hereto) discloses an invention providing "a method of determining suitable letter arrangements, to create an arrangement that is both user-friendly and efficient. The letters in the preferred embodiment are in the familiar alphabetical order so they are easy to find, and their locations are easy to learn and retain. The alphabetical sequence goes from left to right, row by row from top to bottom, first for the left hand, then for the right hand, like reading the pages of a book. This arrangement optimizes efficiency and user-friendliness, maximizing the separation of the most commonly used pairs of letters into the faster, two-handed sequences, while providing a logical and easily recognized layout." (From the Abstract).

The keyboards of the above patents describe patentable keyboard configurations and/or arrangements that provide advantages over keyboards that may appear similar.

OBJECTS AND ADVANTAGES

An objective of the present invention is to provide the users of small hand held electronic devices, such as PC remote controls, mobile phones, personal digital assistants (PDAs), and game controls with a means of data entry that can be operated by one hand. An objective of the present invention is to incorporate substantially the functionality of a full size keyboard into such small devices.

An objective of the present invention is to provide the users with such small devices with full size keyboard functionality that is easy to learn and use.

An objective of the present invention is to minimize the number of strokes needed for data entry for such small devices.

An objective of the present invention is to arrange the full alphabet keys in ways that are familiar to most users hence requiring minimum initial learning time, An objective of the present invention is to arrange the full alphabet keys on a small area so as to maximize the compactness of the keyboard.

An objective of the present invention is to arrange the full alphabet keys on a small area so as to maximize typing efficiency with easy reach of fingers of the using hand to the keys.

An objective of the present invention is to maximize the key area of each key so the fingers of the using hand may touch and press the key comfortably without being interfered by the neighboring keys surrounding it.

An objective of the present invention is to size each key area for the user to select, touch, feel, and press the key with the typing finger comfortably and consistently with the least probability of making errors of typing neighboring keys instead.

An objective of the present invention is to incorporate onto each key a means for the user to visually and tactilely differentiate the radial direction and associated time quickly and easily before selecting, touching, feeling, and pressing it.

An objective of the present invention is to meet the need for remote access to the Internet and to the Internet Protocol TVs that are fast becoming the preferred mode of entertainment delivery by providing the users with compact, hand held devices that are efficient yet easy to learn and use.

An advantage of the present invention is that the key arrangement is compact and yet the number of available key functions is comparable to that of a full size keyboard, such as the standard QWERTY keyboard.

An advantage of the present invention is that the key locations may be associated with clock hour radials, i.e. time, hence easy to remember for those who are already familiar with a twelve-hour clock face.

An advantage of the present invention is that the key arrangement is compact and easily accessible for the fingers of the using hand with minimum travel distance compared to non-circular keyboards.

An advantage of the present invention is that the number of key strokes required to obtain alphabet letters is significantly less than that required by most other hand held keyboards, such as those of the standard telephone keypads.

An advantage of the present invention is that all key areas for alphabet indices is substantially equal so that the user may select, touch, feel, and press the key with the typing finger comfortably and consistently with the least probability of making errors of typing neighboring keys instead.

An advantage of the present invention is that the user can quickly and easily locate the desired key by visually or tactilely perceiving the direction and time of the clock hour radial associated with the key.

SUMMARY OF THE INVENTION

In accordance with the present invention, an alphanumeric keyboard that is so compact as to be mountable on a small handset for one-hand operation is easy to learn and easy to use, comprising concentric first set of twelve hourly radial positions and second set of twelve hourly radial positions, twenty four key areas each being uniquely associated with each hourly radial position of the first and second sets, wherein each key area is substantially of 30 degree annular sector shape and contiguous to the adjacent key areas associated with the adjacent hourly radial positions, wherein all twenty four key areas are substantially of equal area, alphabetic keys placed at the hourly radial positions of the first and second sets, and wherein each key has an indicia surface that is within the associated key area for being pressed by a finger.

BRIEF DESCRIPTION OF THE DRAWINGS

FIG. 3 shows an embodiment of the present invention on a table that lists representative letters, numerals, and symbols assigned to the keys 1 through 28 under four different states of on and off combinations providing four different modes by the key 29 (Num Lock key) and key 31 (Shift key).

DETAILED DESCRIPTION OF THE INVENTION

Figure 1:
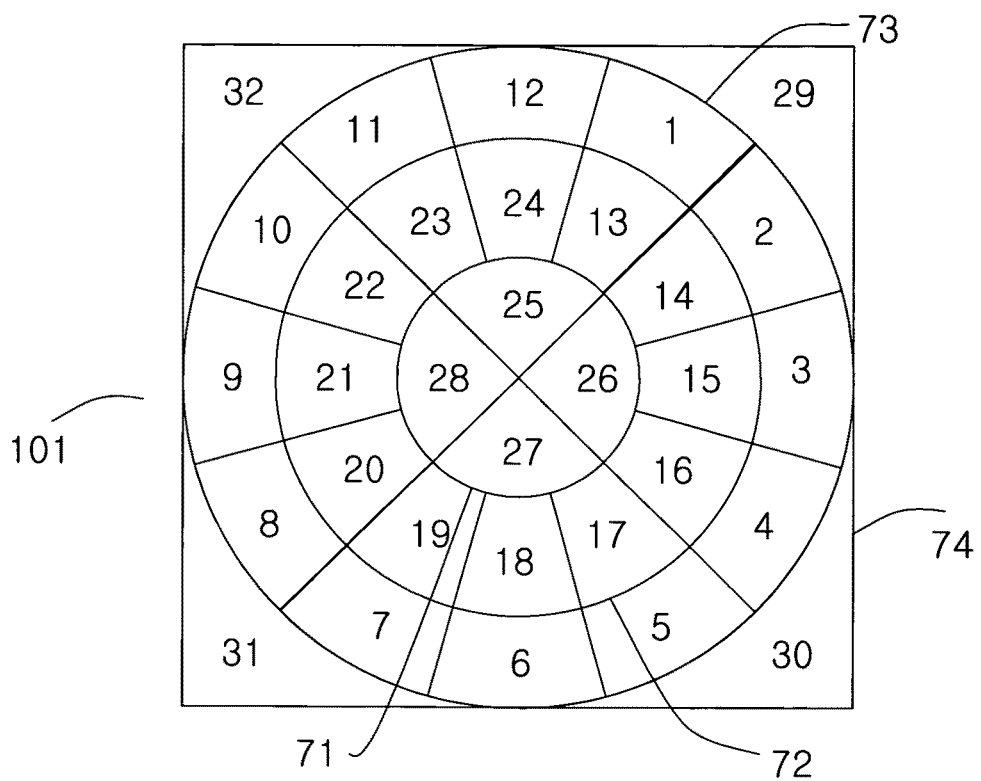
FIG. 1 shows the key locations numbered from 1 to 32 in an embodiment of the present invention: wherein 24 keys are located on two concentric circles, four keys are located in the center of the concentric circles, and an additional four keys are located at each corner within a tangential square surrounding the outer concentric circle. The keys 1-28 have the same key area as will be explained in the detailed description below.
Figure 1A:
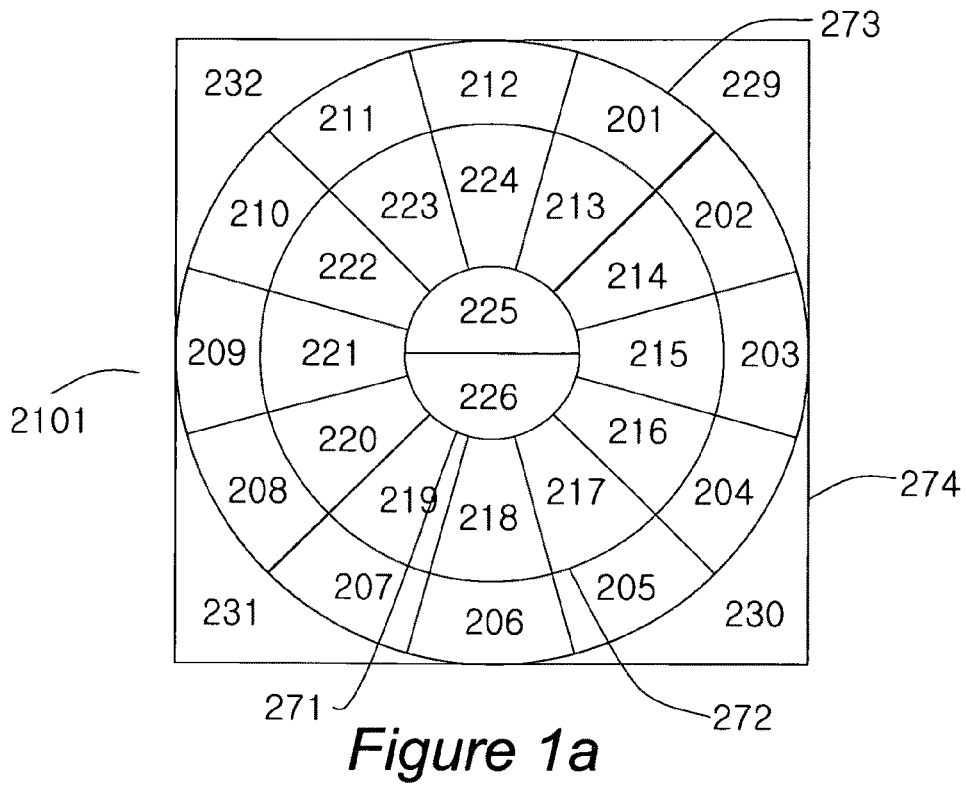
FIG. 1a is similar to FIG. 1 except only two keys, 225 and 226, are located in the center of the concentric circles. The keys 210-226 have the same key area as will be explained in the detailed description below.
Figure 1B:
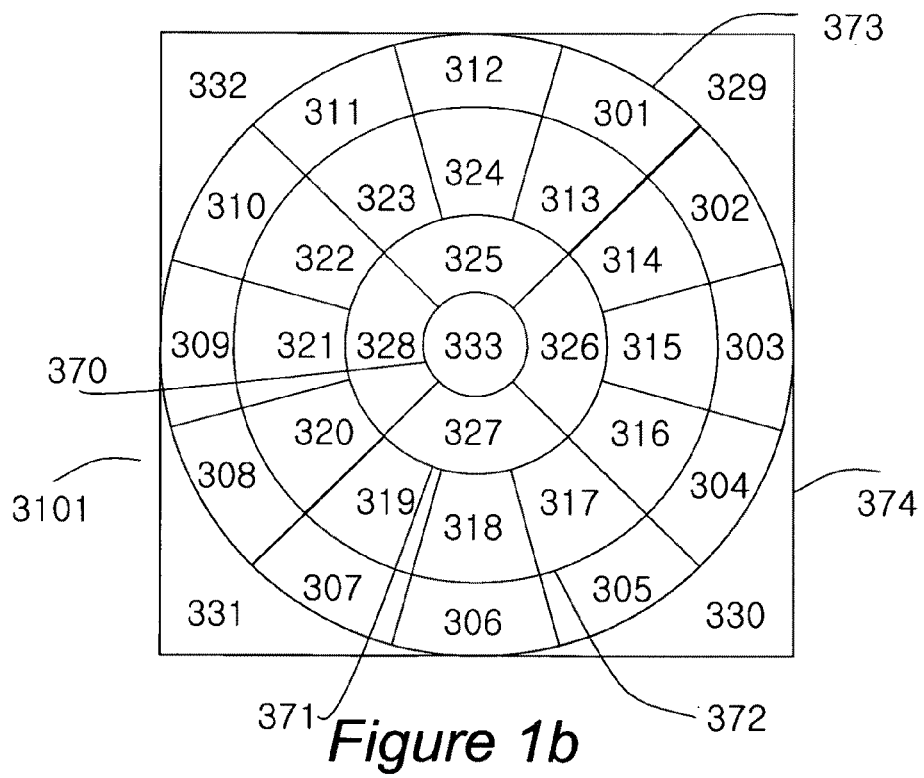
FIG. 1b is similar to FIG. 1 except five keys, 325-328 and 333, are located in the center of the concentric circles. The keys 310-328 and 333 have the same key area as will be explained in the detailed description below.

FIGS. 1, 1a, and 1b show the preferred embodiments of the present invention having 32 keys, 30 keys, and 33 keys, respectively. The keys in FIG. 1 are numbered 1-32, in FIG. 1a 201-226 and 229-232, and in FIG. 1b 301-333. Each key is located substantially on one of the clock hour radials, has an indicia surface, and is within a uniquely associated key area. In the following description, the above key numbers are used to designate each key, the indicia surface of each key, or the associated key area of each key depending on the context.

In the embodiment 101 of FIG. 1, twelve keys numbered 1 to 12 are located on the inner circle within a virtual inner annulus bounded by the concentric virtual circles 71 and 72. Twelve keys numbered 13-24 are located on the outer circle within a virtual outer annulus bounded by the concentric virtual circles 72 and 73. Four keys numbered 25-28 are located in the geometric center bounded by the concentric virtual circle 71. Finally additional four keys numbered 29-32 are located at the four corners within a tangential square 74 surrounding the outer concentric virtual circle 73.

In the embodiment 101 of FIG. 1, the key areas 1-28 are sized to have substantially an equal key area even though their shapes may not be identical. It can be easily shown that the key areas 1-28 are of an equal key area if the ratio of the radii of the concentric virtual circles 71, 72, and 73 are $1:2:\sqrt{7}$ or approx. 1:2:2.65.

The generic clock face keyboard comprises double (inner and outer) concentric circles of keys 1-24 arranged in a configuration that substantially follows the geometry of a twelve-hour clock face, i.e. at 30 degree angular spacing, mapping the hour radial positions on the face of a twelve hour clock. The number of key functions may be multiplied from 24 to 48, 96, 192, etc. if on/off mode functions are given to keys 29-32.

Four additional keys 25-28 are placed in a third circle at the center of the inner and outer concentric circles with each key positioned at the 3 o'clock, 6 o'clock, 9 o'clock and 12 o'clock radial positions. With the use of on/off mode keys 29-32, the center keys 25-28 can multiply the key functions from 4 to 8, 16, 32, etc.

In the above embodiment, the numerals from 0 to 9 may be placed along the outer or inner concentric circle substantially following the layout of twelve-hour clock numerals, while the alphabet letters, or the symbols of the writing system of any language, may be placed over the keys 1-24 of the double concentric circles and over the keys 25-28 of the center circle.

FIG. 1a is similar to FIG. 1 except only two keys, 225 and 226, are located in the center of the concentric circles. The key areas 201-226 are of an equal key area as will be explained below.

In the embodiment 2101 of FIG. 1a, the key areas 201-226 are sized to have substantially an equal key area even though their shapes may not be all identical. It can be easily shown that the key areas 201-226 are of an equal key area if the ratio of the radii of the concentric virtual circles 271, 272, and 273 are $1:17:\sqrt{13}$ or approx. 1:2.65:3.61.

FIG. 1b is similar to FIG. 1 except five keys 325-329 are located in the center of the concentric circles. The key areas 301-328 and 333 are of an equal key area as will be explained below.

In the embodiment 3101 of FIG. 1a, the key areas 301-328 and 333 are sized to have substantially an equal key area even though their shapes may not be all identical. It can be easily shown that the key areas 301-328 and 333 are of an equal key area if the ratio of the radii of the concentric virtual circles 370, 371, 372, and 373 are $1:\sqrt{5}:\sqrt{17}:\sqrt{29}$ or approx. 1:2.24:4.12:5.39.

Figure 2:
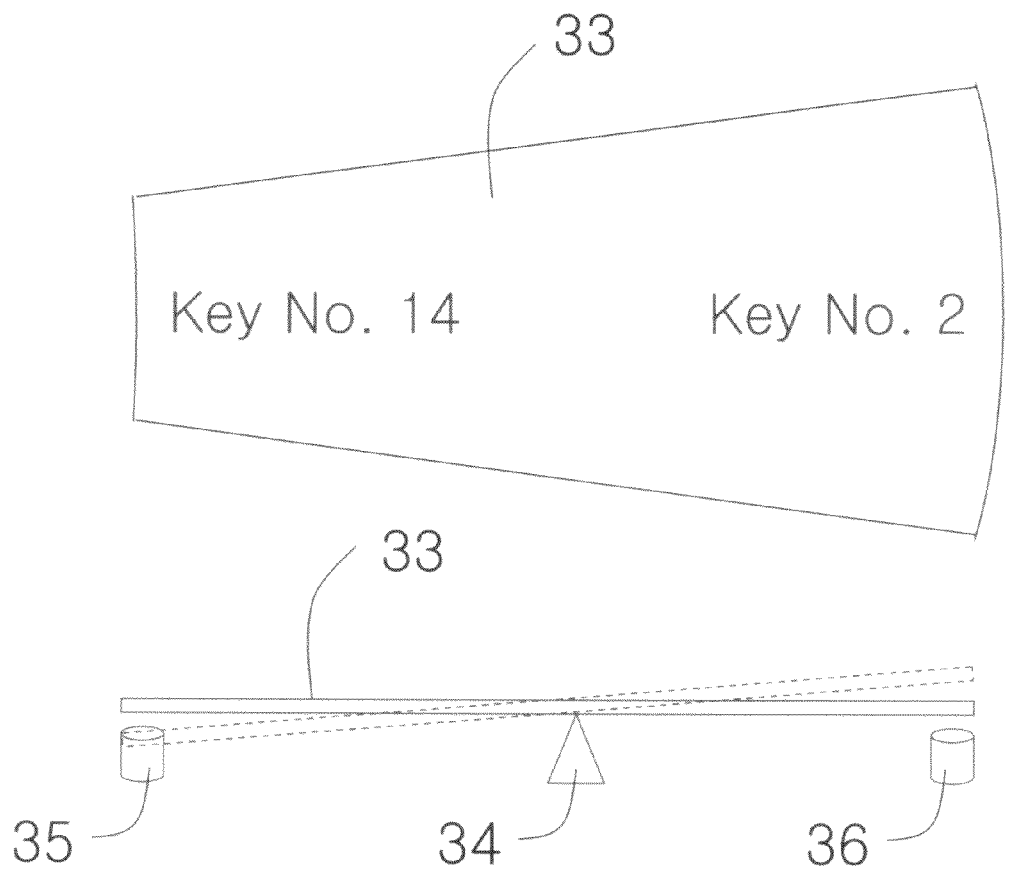
FIG. 2 shows a pair of adjacent keys that are on the concentric circles and on the same clock hour radial, e.g., represented by key 2 and key 14, implemented as a two-way (2-way) rocker key.
Figure 2A:
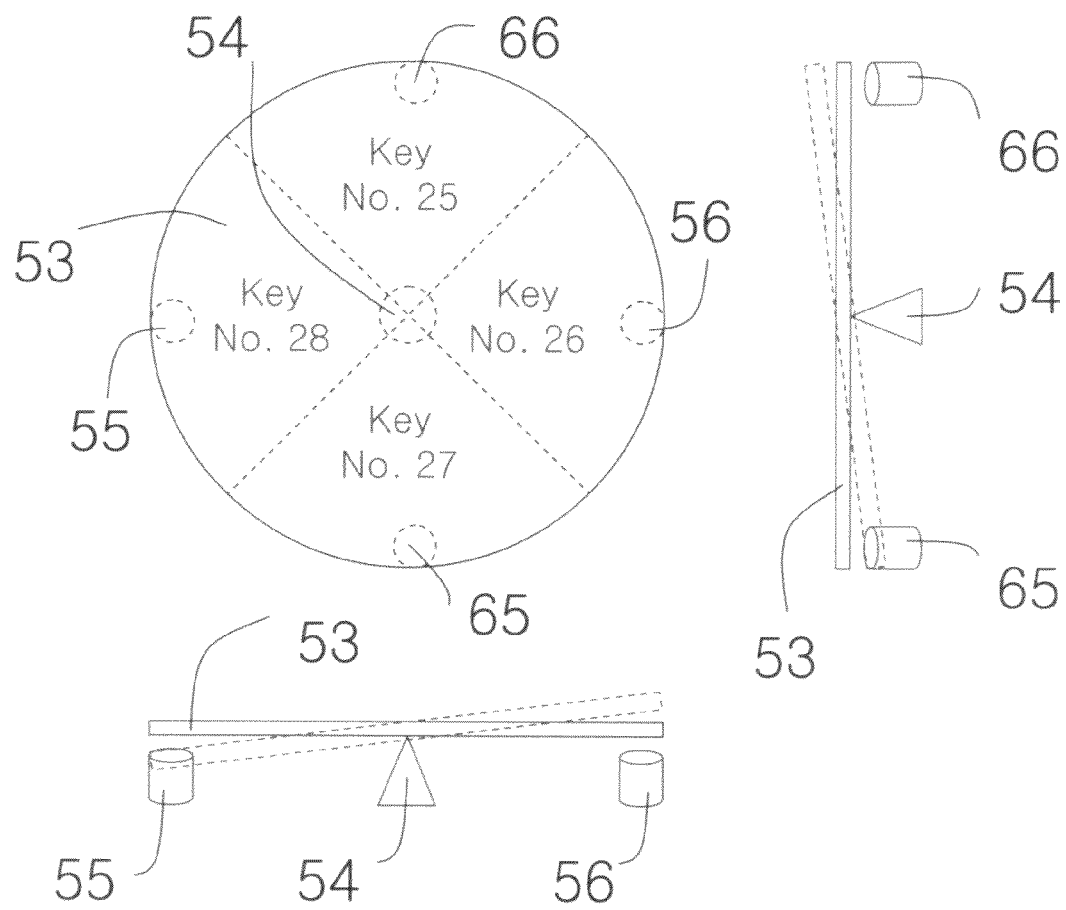
FIG. 2a shows the four central keys, key 25, key 26, key 27 and key 28, implemented as a four-way rocker key.

FIG. 2 shows a radial pair of keys, represented by key 2 and key 14, that are implemented as a two-way rocker key. Any two keys that are located along the same radius (e.g., at the same clock hour) and on adjacent concentric circles may be rigidly joined 33 and mechanically supported in the middle by a fulcrum 34 such that each end of the joined key 33 is movable in a seesaw or rocking motion when pressed. The key 33 then closes the circuitry by making contact with a conductive end of the circuit 35 or 36. Similarly, the four center keys 25, 26, 27, and 28 may be rigidly joined together and mechanically supported at the center 54 such that each corner of the joined key 53 is movable in four ways, 90 degree apart, in a seesaw or rocking motion when pressed, as shown in FIG. 2a. Key 53 then closes the circuitry by making contact with a conductive end of the keyboard circuit 55, 56, 65, 66.

The use of a seesaw or rocking motion for the keys minimizes the number of mechanical components, thereby increasing mechanical reliability, and simplifying the manufacture of the device while increasing its user friendliness and ergonomics. Without reducing the total number of key functions, the actual number of keys and keys in this embodiment may be reduced from 32 to only 17 (12 two-way rocker keys, one centrally located four way rocker key, and four individual keys at the corners of the tangential square).

The clock face placement of numerals is graphically known to most people and is well known to the art. See, for example, U.S. Pat. No. 5,701,123 to Samulewicz, U.S. Pat. No. 6,173,194 to Vanttila, U.S. Pat. No. 6,925,315 to Langford, U.S. Pat. No. 6,954,355 to Gerstner et al.

The number of alphabet letters of the most advanced writing systems, however, typically exceeds twelve, e.g., the English alphabet consists of 26 letters and the Korean alphabet consists of 24 letters. Since the number of hour marks on a 12 hour clock face is twelve, however, the clock face is not known to have been used for creating an alphanumeric keyboard layout. An inventive feature of the present invention is the use of plurality of concentric circles and the familiar clock face layout for each circle to create a larger number of available keys, thereby providing a novel, fully populated keyboard in a relatively small space, with effective utilization of space such that the size of each key is large enough to be acceptable for people with average size fingers to touch, feel, and press for data entry.

By placing both the numerals and alphabet letters in such a clock face arrangement, one gains two major benefits: (1) one can more easily remember the locations of numerals and alphabet letters because the arrangement substantially follows that of a clock, the geometry of which is already familiar to most people, and (2) the key arrangement is compact and permits placement of a large number of alphanumeric character keys in a relatively small space, such as that of existing hand held devices, thereby providing for additional functions.

Although the twelve-hour clock face arrangement of numeric keys are available from many prior arts, the use of the clock face geometry in double (inner and outer) concentric circles combined with on/off mode keys provides the users with available key functions in multiples of 24, i.e., 24, 48, 96, etc. functions, thereby to accommodate alphabets of 24 or more characters.

In the geometric center of the keypad is another circle of keys which is divided into only four or less keys so as to maintain the key size to be compatible with the finger tip size of an ordinary person. Additional keys are placed outside the outermost concentric circle and inside the square whose four edges are tangential to the outermost concentric circle, respectively. In other words, four additional keys may be located in the corner spaces created between the outer concentric circle and the tangential square thereof. These four corner spaces are usually available for most devices that are of a rectangular or square shape.

In the present embodiment, the 28 keys located on three concentric circles (e.g., the inner and outer concentric circles and the center circle) are used as alphanumeric keys and the four corner keys are used as selected control keys that are frequently used, including number lock key 29, enter key 30, shift key 31, and back space key 32. It is easily envisioned that these four corner keys 29-32 may be assigned additional alphanumeric functions instead, in which case, additional keys may be placed outside the tangential square to assign the same control functions. Although in the present embodiment 32 keys are shown and additional keys are not shown, such additions of additional keys outside the tangential square may be expected depending on the specific applications.

FIG. 3 lists the representative alphanumeric symbols that may be assigned to each of the 32 keys of the present keyboard arrangement (e.g., 12 keys on each of two concentric circles, four centrally located keys 25-28, and four outer keys 29-32) when the Number Lock key 29 and the Shift key 31 are turned on or off, respectively, to serve as mode keys.

If the Number Lock key (key 29) is pressed once, the internal key is actuated such that the remaining keys, e.g., alphabetic keys 1-24, function as numeric and related symbol keys. If this key 29 is pressed again, then the keys 1-24 return to the previous function, e.g., to function as alphabet and related symbol keys. Thus, Num Lock key 29 acts as a toggle key to activate and deactivate the Number Lock function.

Figure 4:
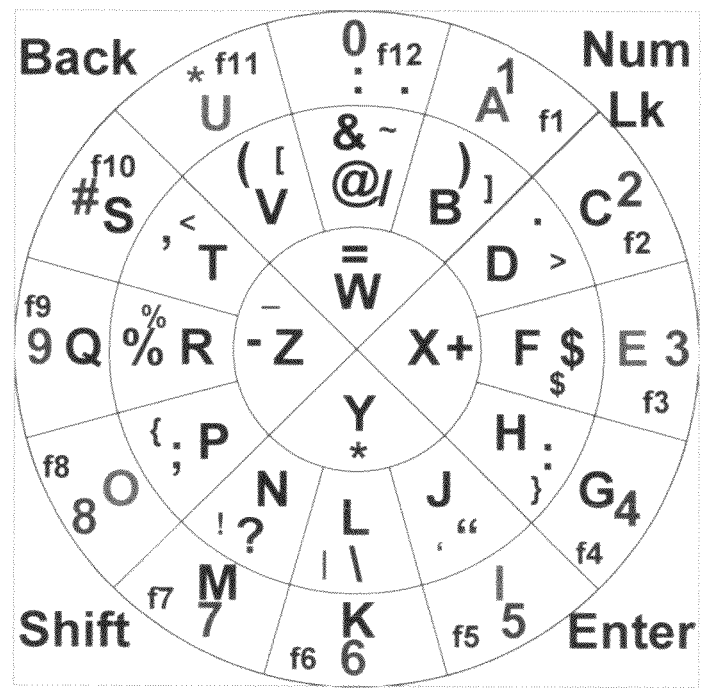
FIG. 4 shows an alphanumeric clock face keyboard with the symbols marked on the indicia of each key according to the list shown in FIG. 3.

With the Num Lock key 29 toggled to alphabetic mode, if the Shift key (key 31) is pressed once, the remaining keys 1-24 function to provide one set of alphanumeric letters, such as upper case letters of the English alphabet. If this same key is pressed again, then the keys 1-24 return to the previous function and one obtains another set of the alphanumeric letters, such as lower case letters of the English alphabet. Thus, Shift key 31 acts as toggle key to key between two sets of characters. With the Num Lock key 29 toggled to the numeric/symbol mode, Shift key 31 renders keys 1-24 in a mode to provide additional symbols and functions, which may include functions f1-f12 as seen in FIG. 4.

Thus, the total number of available characters and symbols in the present keyboard arrangement is 112, i.e., 28 (i.e., 32 minus Num Lock key 29 minus Shift key 31 minus two additional function keys 30, 32) times 4 equals 112. This number of different functions is sufficient for most alphanumeric data entry, comparable to that of the full QWERTY alphanumeric keyboard, e.g. a complete QWERTY computer keyboard, but requiring fewer keys.

The inventive feature of this invention is the use of a plurality of concentric circles of keys (and keys) 1-28 and the familiar clock face layout for each concentric circle to create a maximum number of key functions, resulting in a novel, fully populated keyboard in a relatively small space, with efficient usage of space such that the size of each key is still acceptable for an average size finger to touch, feel, and press for data entry.

The inventive feature of this invention is the use of additional mode keys/keys, such as Number Lock key 29 and Shift key 31, for providing functions in multiples of 2, 4, or 8 times the actual number of keys (depending on the number of such keys) thereby to provide a total number of available key functions of, e.g., 48, 96, 192, etc. if 24 keys are available, or of 56, 112, 224, etc. if center keys 25-28 are available.

The inventive feature of this invention is the use of two way- and four way-rocking motion keys to minimize the number of mechanical components, thus increasing mechanical reliability, simplifying the manufacture of the device, and increasing its user friendliness and ergonomic effect.

Figure 5:
FIG. 5 shows an embodiment of the present invention showing the English alphabet arranged substantially following the traditional QWERTY keyboard, folded to two concentric sets of the clock hour radials, and showing the numerals from "0" to "9" and the "*" and "#" symbols arranged along two concentric sets of clock hour radials from 11 o'clock to 1 o'clock substantially following the layout of the standard numeric key pad of a standard telephone.
Figure 6:
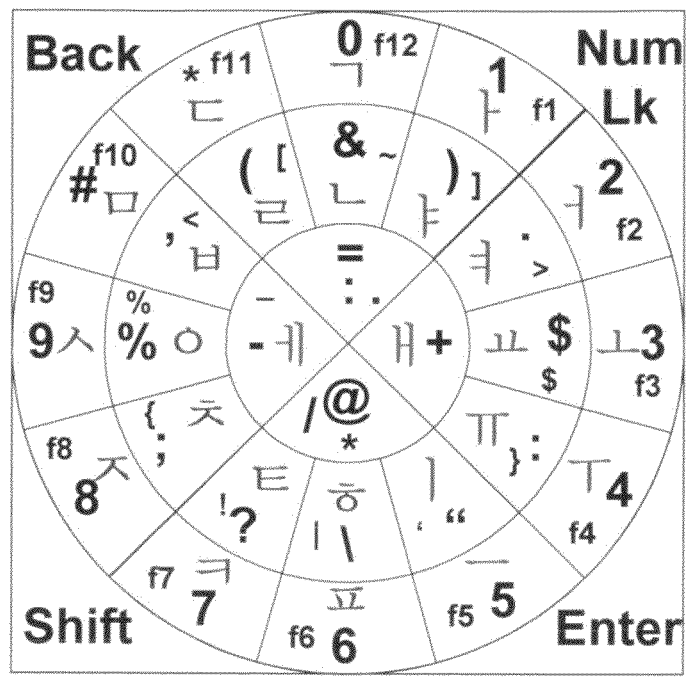
FIG. 6 shows a clock face alphanumeric keyboard with the fourteen consonant symbols of the 24 character Korean Hangeul alphabet placed substantially from the 6 o'clock position to the 12 o'clock position and the remaining ten vowel symbols placed substantially from the 1 o'clock position to the 5 o'clock position.

FIGS. 4-6 show letters and symbols assigned to the keys of the present invention as will be described in detail below.

(1) A novel feature of the present invention is to place the English alphabet as in FIG. 4 sequentially in the clockwise direction, "a" on first circle and "b" on second circle in one o'clock direction, "c" on first circle and "d" on second circle in two o'clock direction, etc. First circle is either the inner concentric circle or the outer concentric circle while second circle is the other of the two. 22 keys are arranged from 1 o'clock to 11 o'clock directions. Four remaining alphabet keys are arranged near the geometric center. To find any alphabet letter indicia, one only has to scan circularly once from one o'clock to 11 o'clock locations, then near the center. A novel feature of the present invention is that in this arrangement, the locations of all five vowels (a, e, i, o, u) are on first circle and symmetric with respect to 2 o'clock or 8 o'clock direction. Since the vowels are more frequently used than consonants, this feature helps the learning and the typing efficiency.

(2) A novel feature of the present invention is to place the English alphabet substantially like QWERTY keyboard as in FIG. 5. It is recognized that a keyboard arrangement resembling a folded QWERTY is possible on a clock face keyboard even though the folds are at irregular angles alternating over concentric circles.

In these embodiments, the numbers 0-9 and * and # symbols for the phone function are arranged in two specific ways as described in detail below.

(3) First numeric arrangement is to match the numbers 0-9 and * and # symbols with the clock hour indicia from 12 o'clock to 11 o'clock in that order in the clockwise directions. They can be placed on first concentric circle, on second concentric circle, or on both circles.

(4) Second numeric arrangement is to emulate a standard numeric keypad albeit circularly rather than rectilinearly. A novel feature of the present invention is to arrange the number keys, 1-3 and 4-6 respectively on the outer and inner circles in 11 o'clock, 12 o'clock, and 1 o'clock directions, and 7-9, and *, 0, and # respectively on the inner and outer circle in 7 o'clock, 6 o'clock, and 5 o'clock directions, by recognizing that a keypad arrangement resembling the standard numeric keypad is possible on a clock face keyboard.

A clock face keyboard, according to the present invention, can be manifested with the combination of any one of the above alphabet arrangements ((1) or (2)) and any one of the above numeric arrangements ((3) or (4)). The QWERTY key arrangement of FIG. 5 is novel and inventive since there are no recognizable rows found in the standard QWERTY keyboard of substantially rectangular shape, nor any recognizable left end key or right end key. The QWERTY key arrangement of FIG. 5 enhances the familiarity of the circular keyboard to those users who are already familiar with the QWERTY keyboard hence the ease of learning and ease of use while the compactness of the clock face circular keyboard is still maintained.

Figure 5A:
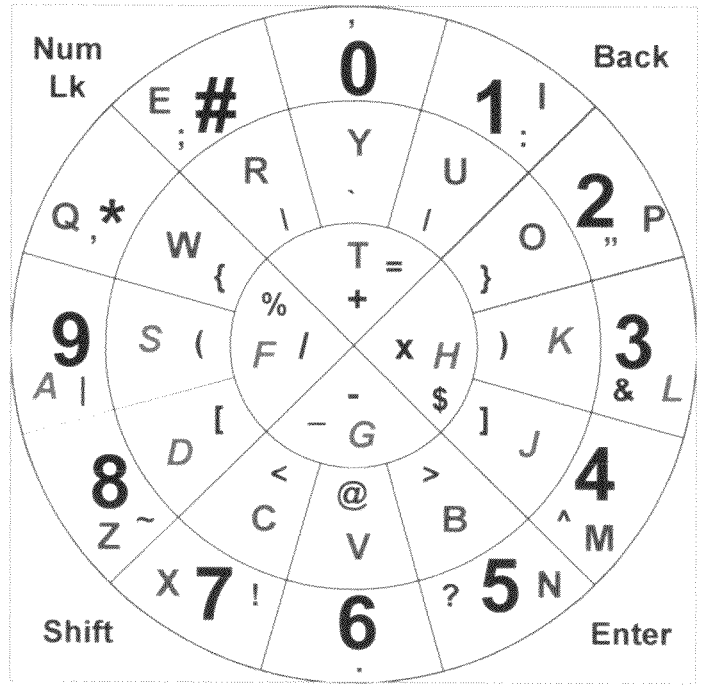
FIG. 5a is an embodiment of the present invention similar to FIG. 5 except the QWERTY sequence keys are folded among the inner circle, outer circle, and central groups of keys, and the numerals from "0" to "9" and the "*" and "#" symbols are placed on the outer circle from one o'clock to 12 o'clock radial positions in that order.

FIG. 5a is an embodiment of the present invention similar to FIG. 5 except the QWERTY sequence keys are folded among the inner circle, outer circle, and central groups of keys, and the numerals from "0" to "9" and the "*" and "#" symbols are placed on the outer circle from one o'clock to 12 o'clock radial positions in that order.

Figure 5B:
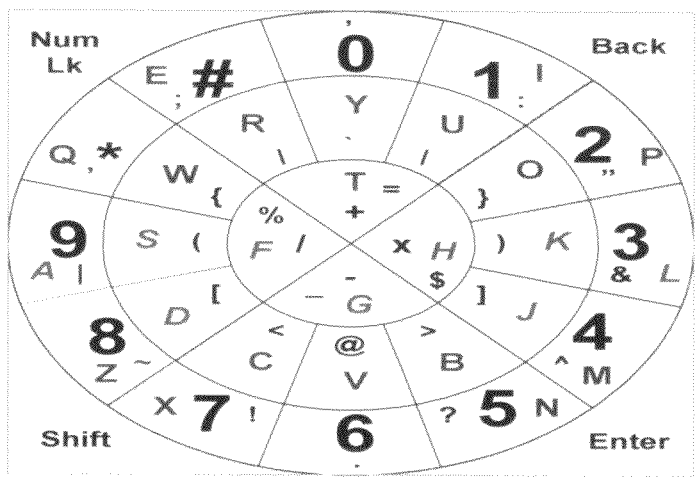
FIG. 5b is an embodiment of the present invention similar to FIG. 5a except the alphanumeric clock face keyboard is shrunk in the vertical direction in a predetermined proportion.

FIG. 5b is an embodiment of the present invention similar to FIG. 5a except the alphanumeric clock face keyboard is shrunk in the vertical direction in a predetermined proportion. Since such directional resizing distorts the clock face geometry, the angular positions of the keys are no longer 30 degree apart from the adjacent keys. Still, the number of keys and the relative size of the key areas remain unchanged, thus the advantages of the clock face keyboard of the present invention remain to be effective. Thus in some cases, a distorted elliptical clock face may be used instead of the perfect circular clock face to maximize the use of the available keyboard area of a hand held device.

The QWERTY arrangements substantially improve the ease of learning and ease of use of the clock face keyboard over other random arrangements. First learning process is to associate the clock face keyboard with the standard QWERTY layout. To find an alphabet letter, one who is familiar with the QWERTY layout only needs to slightly adjust to the new folded layout. Second learning process is to associate each letter with its radial direction or time. Thus, the combination of the QWERTY layout and the associated radial direction or time makes this keyboard easy to learn and to use.

The present invention provides a full alphanumeric keyboard with substantially a square form factor for easy incorporation in the handsets of a small form factor. The result achieved by the present invention is new, unexpected, and superior to prior art when applied to the handsets with a small form factor.

In FIG. 6, a Korean Hangeul alphanumeric keyboard places the fourteen consonant symbols of the 24 symbol Korean Hangeul alphabet substantially from the 6 o'clock position to the 12 o'clock position and the remaining ten vowel symbols of the Korean Hangeul alphabet are placed substantially from the 1 o'clock position to the 5 o'clock position.

The fourteen consonants of Korean alphabet are substantially on the left side of the concentric circles (6 o'clock to 12 o'clock directions) and the ten vowels of the Korean alphabet are substantially on the right side of the concentric circles (1 o'clock to 5 o'clock directions.)

First learning process is to scan from top to bottom substantially the left half of the clock face keyboard to find a consonant letter and scan top to bottom substantially the right half of the clock face keyboard to find a vowel letter.

Second learning process is over time to associate each letter with the associated clock radial or time. Thus, the combination of the left-right layout and the associated time makes this keyboard easy to learn and to use.

Figure 6A:
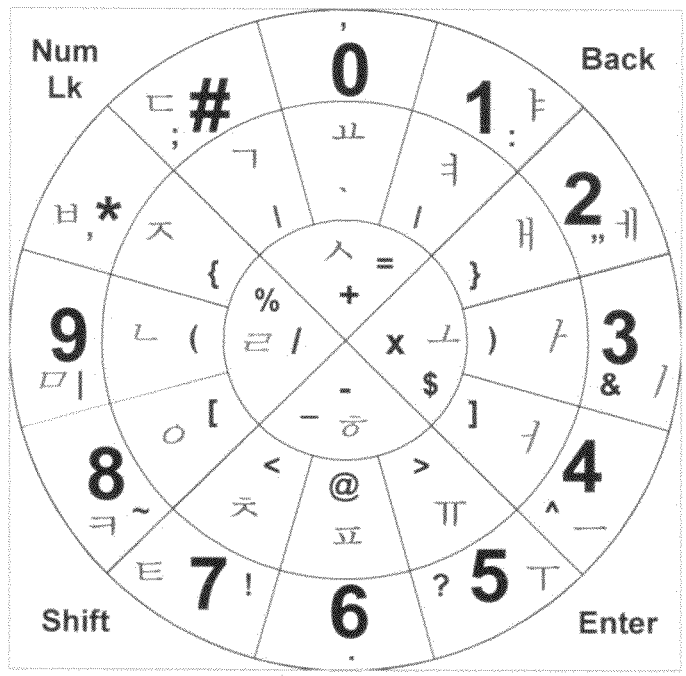
FIG. 6a is the same as FIG. 5a except the 24 Hangeul alphabet letters and two frequently used combination vowel letters of Korean alphabets, a total of 26, replace the English alphabet letters substantially following the standard one to one correspondence that is used for Korean language typing on a standard QWERTY keyboard.

FIG. 6a is the same as FIG. 5a except the 24 Hangeul alphabet letters and two frequently used combination vowel letters of Korean alphabets, a total of 26, replace the English alphabet letters substantially following the one to one correspondence that is used for Korean language typing on the standard QWERTY keyboard.

The invention is not intended to be limited to the particular arrangements of symbols discussed above as examples and shown in the drawings, but also encompasses reasonable modifications and equivalents within the scope of the appended claims, which define the scope of exclusive rights that are claimed.

Additional keys may be placed outside the footprint of the keyboard 101, 2101, Or 3010 to provide more key functions as needed and as footprint space permits.

Figure 7:
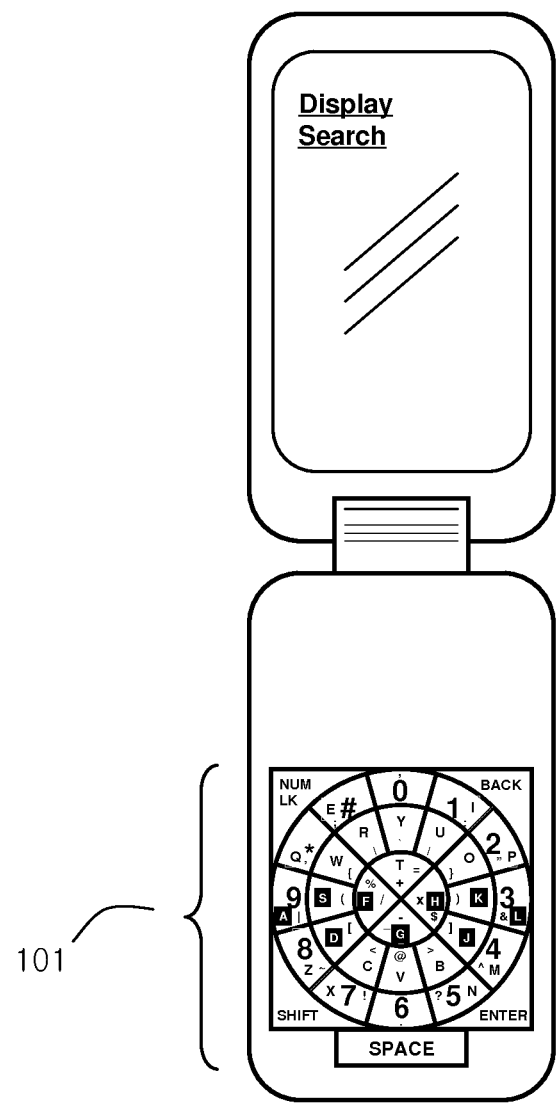
FIG. 7 shows an embodiment of the present keyboard arrangement on a cell phone.

FIG. 7 shows an embodiment of the present keyboard arrangement on a cell phone. The advantage of the present invention is providing the regular folks with a full alphanumeric input capability and smart functions on their small form factor regular cell phones.

Figure 8:
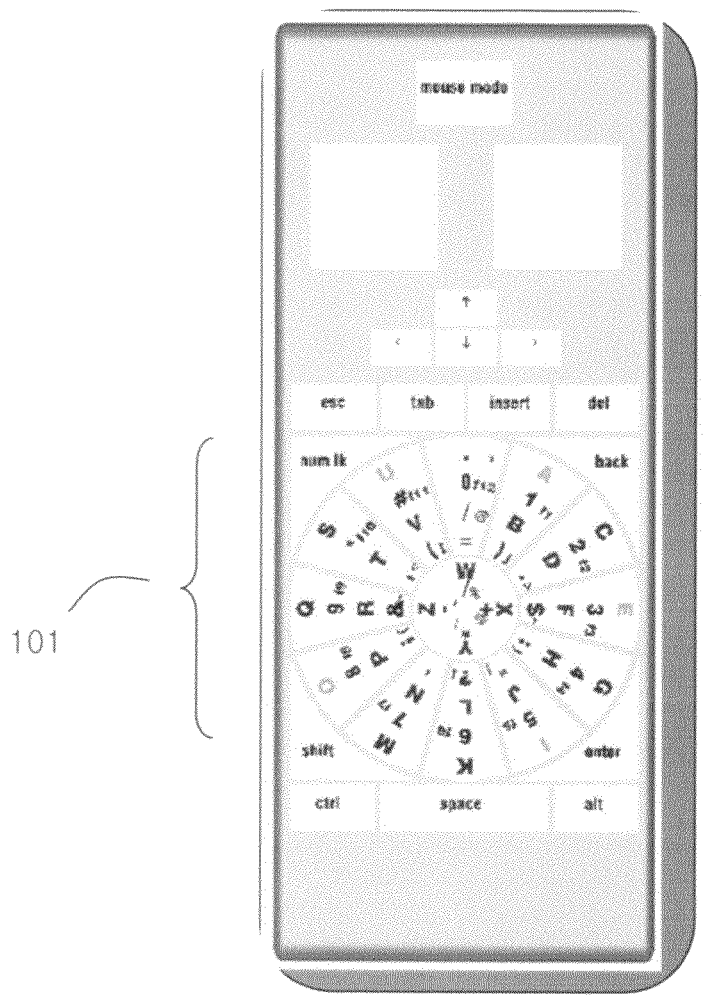
FIG. 8 shows an embodiment of the present keyboard arrangement on a remote computer controller having additional functional keys externally arranged, including Ctrl, Space, Alt, Esc, Tab, Insert, Del, Up Arrow, Down Arrow, Left Arrow, Right Arrow, and Mouse Mode, etc.

FIG. 8 shows a representative application of the present invention to a PC remote controller with the generic clock face keyboard of the present invention 101 providing most of the key functions, with additional keys, Ctrl, Space, Alt, Esc, Tab, Insert, Del, Up Arrow, Down Arrow, Left Arrow, Right Arrow, and Mouse Mode, etc., added in available space.

Figure 9:
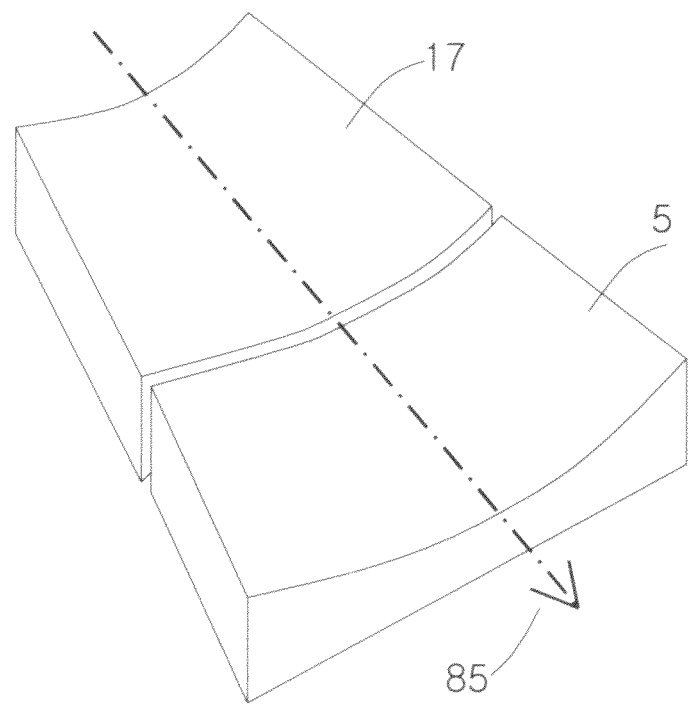
FIG. 9 shows keys 5 and 17 having circumferential concavity, respectively, with respect to the five o'clock direction 85.

FIG. 9 shows keys 5 and 17 having respectively a circumferential concavity with respect to the five o'clock radial direction 85. The circumferentially concave surface promotes easy recognition of the associated clock radial or time, 5 o'clock in this case, hence promotes easy visual recognition of the particular keys, for instance I and J in FIG. 4. The circumferentially concave surfaces also promotes a tactile recognition of the associated time, 5 o'clock in this case, hence promotes easy selection and typing of the particular keys without visual aid, for instance I and J in FIG. 4.

Figure 9A:
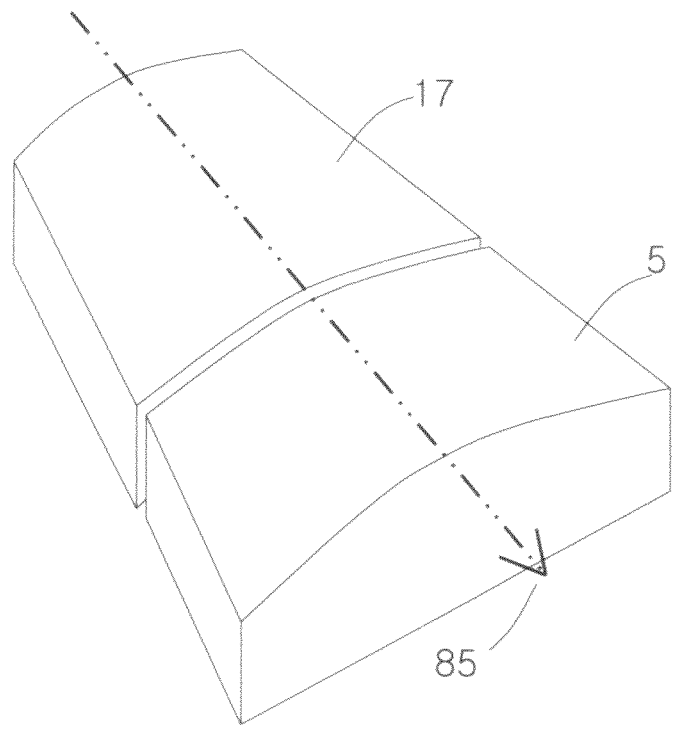
FIG. 9a shows keys 5 and 17 having circumferential convexity, respectively, with respect to the five o'clock direction 85.

FIG. 9a shows keys 5 and 17 having respectively a circumferential convexity with respect to the five o'clock radial direction 85. Compared to FIG. 9, the associated time is recognized visually and tactilely by the convexity rather than concavity. All advantages stated for FIG. 9 are also applicable for FIG. 9a.

There are other ways to mark the associated radial direction or time, such as grooves or protruded lines aligned in the same direction, or even just protruded dots located on the hour mark, that can promote the similar advantages as described in the above. The present invention is not limited to any particular means of marking the associated time.

Figure 10:
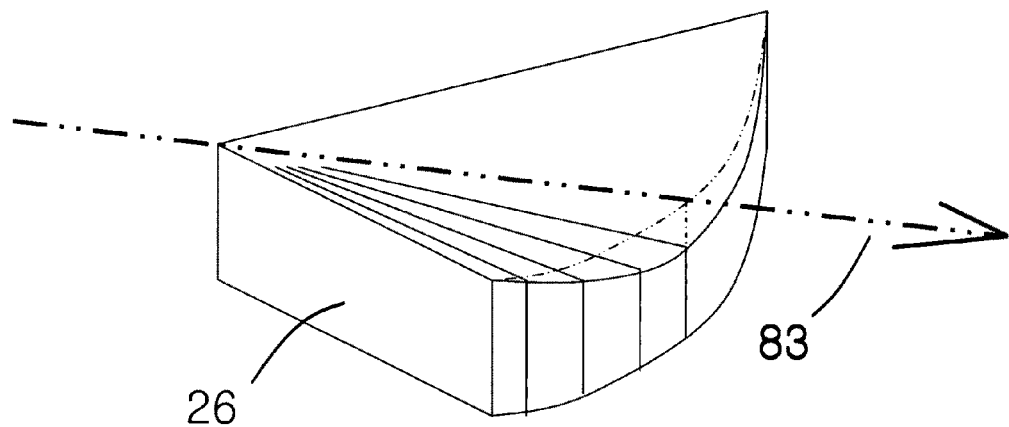
FIG. 10 shows keys 26 having circumferential concavity with respect to the three o'clock direction 83.

FIG. 10 shows key 26 having a circumferential convexity with respect to the three o'clock radial direction 83. The circumferentially concave surface promotes easy recognition of the associated time, 3 o'clock in this case, hence promotes easy visual recognition of the associated keys, for instance X in FIG. 4. The circumferentially concave surfaces also promotes a tactile recognition of the associated time, 3 o'clock in this case, hence promotes easy selection and typing of the associated keys without visual aid, for instance X in FIG. 4.

Figure 10A:
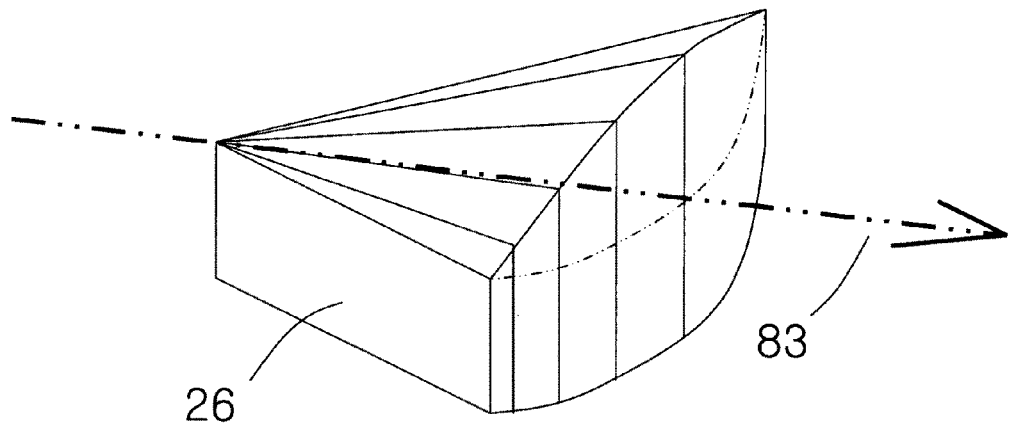
FIG. 10a shows keys 26 having circumferential convexity with respect to the three o'clock direction 83.

FIG. 10a shows key 26 having a circumferential convexity with respect to the three o'clock direction 83. Compared to FIG. 10, the associated time is recognized visually and tactilely by the convexity rather than concavity. All advantages stated for FIG. 10 are also applicable for FIG. 10a.

A generic clock face keyboard may comprise double (inner and outer) concentric circles of keys arranged in a configuration that substantially follows the geometry of a twelve-hour clock face, i.e. at 30 degree angular spacing.

The keyboard arrangement may implement adjacent pairs of concentric keys each as a two-way rocker key, and may also include a generic key in a central location within both concentric circles.

The generic key may include a four-way rocker key in the central location.

The clock face keyboard arrangement may be situated within a tangential square that provides four additional key locations, one at each corner thereof.

The clock face keyboard may incorporate additional, two way (i.e., position 1 and position 2) functional keys, to increase the number of generic key functions in multiples of 24, i.e. to 24, 48, 96, 192, etc. key functions.

The clock face keyboard may have an alphanumeric keyboard such that 22 of the 26 English alphabet letters are placed along the double concentric circles from the 1 o'clock to the 11 o'clock positions and the remaining four letters are placed in the center circle at the 3 o'clock, 6 o'clock, 9 o'clock, and 12 o'clock positions, with the numerals from "0" to "9" and the "*" and "#" symbols placed along one of the concentric circles substantially following the layout of a clock face from the 12 o'clock position to the 11 o'clock position in the clockwise order.

The clock face keyboard may be an alphanumeric keyboard with the English alphabet placed substantially following the traditional QWERTY keyboard, except that each row or each pair is folded into two and the numerals from "0" to "9" and "*" and "#" symbols are placed along the plurality of concentric circles from the 11 o'clock position to the 1 o'clock position substantially following the layout of the traditional numeric key pad of the QWERTY keyboard.

The clock face keyboard may be an alphanumeric keyboard with the fourteen consonant symbols of the 24 symbol Korean Hangeul alphabet placed substantially from the 6 o'clock to the 12 o'clock positions and the remaining ten vowel symbols thereof placed substantially from the 1 o'clock to the 5 o'clock positions.

The present invention's clock face arrangement provides a substantial improvement over Jung leading to the full alphanumeric keyboard that is (1) more compact and (2) easier to learn and use. The circular keyboard claimed in the present invention achieves familiarity by locating the alphabet letters substantially on the clock hour radial marks and only on the clock hour radial marks albeit on plural concentric clock faces of the inner and outer circles. The present invention clock face keyboard is believed to be easier to learn, at least to most users, because the alphabet letter positions are associated with the familiar hourly radial positions.

The present invention describes at least two centrally located alphabet letter keys also on the clock hour radial marks and internal to both the first inner set of 12 keys and the second outer set of 12 keys for providing a 26-letter alphabet. The objective is to create a maximum number of alphabet letter keys in a small space for a fully populated keyboard with the maximum usage of space. (Min US2007/0086825A1 Application at Para. [0041]). Compared to the Min 2007/0086825A1 Application, the Jung U.S. Pat. No. 6,657,560 Patent's rounded keyboard requires a relatively larger space for alphabet letters because the second outer set has more than 12 keys, typically 14-20 keys, and because any additional alphabet keys are located external to both the first set and the second set, e.g., as in FIG. 8h. Jung includes centrally located keys only for functions, space, or other control purposes (Jung Patent at Col. 8, lines 4-16; Col. 8, line 66 to Col. 9, line 8; Claims 5, 6, 20, 21, 22, 23), but not for alphabet letters. Thus, the Jung Patent's alphabet layout tends to be less compact than that of the present invention, and so Min improves over Jung for providing a more compact alphabet keyboard.

A clock face keyboard may provide at least twenty four keys for alphabetic characters and optionally for numeric characters, comprising: first and second sets of twelve switches arranged in respective concentric circles, an inner concentric circle thereof consisting of the twelve switches of the first set of twelve switches and an outer concentric circle thereof consisting of the twelve switches of the second set of twelve switches, wherein the twelve switches of each of the inner and outer concentric circles are arranged in a configuration that substantially follows the radial geometry of a clock face having the twelve switches arranged at a 30 degree angular spacing in positions from a one o'clock position to a twelve o'clock position with one switch of each of the inner and outer concentric circles on each hourly radial, and first and second sets of twelve keys arranged on the inner and outer concentric circles, each key thereof being associated with a respective switch of the first and second sets of twelve switches for being pressed for actuating the respective switch of the first and second sets of twelve switches, wherein each key of the first and second sets of twelve keys has a surface for receiving an indicia of an alphabetic character, or a numeric character, or a symbol, or a combination thereof, and wherein the clock face keyboard provides at least twenty four keys for alphabetic characters comprising a complete alphabet.

The clock face keyboard may have the switches of the first and second sets of switches that are adjacent each other on the radial of the same hour of the clock face geometry each comprise a two-way rocker switch.

The clock face keyboard may further comprise a central switch located near the geometric center of the inner and outer concentric circles of twelve switches.

The clock face keyboard may have the central switch providing at least two keys and no more than four keys.

The clock face keyboard may have the central switch including a two-way rocker switch or a four-way rocker switch.

The clock face keyboard may have the inner and outer concentric circles of twelve switches that are situated within a tangential square that provides up to four additional switch locations, one at each corner between the outer concentric circle of switches and the tangential square.

The clock face keyboard may have the inner and outer concentric circles of twelve switches that are situated within a tangential square that provides up to four additional switch locations, one at each corner between the outer concentric circle of switches and the tangential square.

The clock face keyboard may further comprises one or more two way functional keys each having first and second positions that change the functions of the switches of the first and second sets of twelve switches, thereby to increase the number of key functions in multiples of 24, whereby the functions of the switches of the first and second sets of twelve switches may provide 24, 48, 72, 96, or more key functions.

The clock face keyboard may further comprise one or more two way functional keys each having first and second positions that change the functions of the switches of the first and second sets of twelve switches, thereby to increase the number of key functions in multiples of 28, whereby the functions of the switches of the first and second sets of twelve switches may provide 28, 56, 84, 112 or more key functions.

The clock face keyboard may provide an alphanumeric keyboard for letters of the English alphabet, wherein 22 of the 26 English alphabet letters are on the inner and outer concentric circles from the one o'clock to the eleven o'clock positions, and wherein the remaining four of the 26 English alphabet letters are on a central switch located near the geometric center of the inner and outer concentric circles of twelve switches, the remaining four letters being in three o'clock, six o'clock, nine o'clock, and twelve o'clock positions of the central switch.

The clock face keyboard may have numerals from "0" to "9" and "*" and "#" symbols that are located on one of the inner and outer concentric circles substantially following the layout of a clock face from the twelve o'clock position to the eleven o'clock position in clockwise order.

The clock face keyboard may provide an alphanumeric keyboard for letters of the English alphabet, wherein 22 of the 26 English alphabet letters are on the inner and outer concentric circles from the one o'clock to the eleven o'clock positions, and wherein the remaining four of the 26 English alphabet letters are on a central switch located near the geometric center of the inner and outer concentric circles of twelve switches, the remaining four letters being in three o'clock, six o'clock, nine o'clock, and twelve o'clock positions of the central switch.

The clock face keyboard may have numerals from "0" to "9" and "*" and "#" symbols are located on one of the inner and outer concentric circles substantially following the layout of a clock face from the twelve o'clock position to the eleven o'clock position in clockwise order.

The clock face keyboard may provide an alphanumeric keyboard for letters of the English alphabet placed substantially following the traditional QWERTY keyboard, wherein each row of English alphabet letters thereof or each adjacent pair of English alphabet letters thereof is folded into keys of the inner and outer concentric circles and of a central switch located near the geometric center of the inner and outer concentric circles of twelve switches.

The clock face keyboard may provide an alphanumeric keyboard, wherein the numerals from "0" to "9" and "*" and "#" symbols are on keys of the inner and outer concentric circles from the eleven o'clock position to the one o'clock position and from the five o'clock position to the seven o'clock position substantially following the layout of the numeric key pad of a telephone.

The clock face keyboard may provide an alphanumeric keyboard for symbols of the Korean Hangeul alphabet, wherein the fourteen consonant symbols of the Korean Hangeul alphabet are on keys of the inner and outer concentric circles substantially from the six o'clock position to the twelve o'clock position, and wherein the remaining ten vowel symbols of the Korean Hangeul alphabet are on keys of the inner and outer concentric circles substantially from the one o'clock position to the five o'clock position.

The clock face keyboard may provide an alphanumeric keyboard for symbols of the Korean Hangeul alphabet, wherein the fourteen consonant symbols of the Korean Hangeul alphabet are on keys of the inner and outer concentric circles substantially from the six o'clock position to the twelve o'clock position, and wherein the remaining ten vowel symbols of the Korean Hangeul alphabet are on keys of the inner and outer concentric circles substantially from the one o'clock position to the five o'clock position.

A clock face keyboard may provide at least twenty six keys for alphabetic characters and for numeric characters, said clock face keyboard comprising: first and second sets of twelve switches arranged in respective concentric circles, an inner concentric circle thereof consisting of the twelve switches of the first set of twelve switches and an outer concentric circle thereof consisting; of the twelve switches of the second set of twelve switches, wherein the twelve switches of each of the inner and outer concentric circles are arranged in a configuration that substantially follows the radial geometry of a clock face having the twelve switches arranged at a 30 degree angular spacing in positions from a one o'clock position to a twelve o'clock position with one switch of each of the inner and outer concentric circles on each hourly radial, whereby the twenty four switches of the inner and outer concentric circles of switches provide for at least twenty four characters; a central switch located near the geometric center of the inner and outer concentric circles of twelve switches for providing at least two switches; first and second sets of twelve keys arranged on the inner and outer concentric circles, each key thereof being associated with a respective switch of the first and second sets of twelve switches for being pressed for actuating the respective switch of the first and second sets of twelve switches; at least two keys located near the geometric center of the inner and outer concentric circles, each being associated with a respective one of the at least two switches of said central switch; wherein each key of the first and second sets of twelve keys and each of the at least two keys has a surface for receiving an indicia of an alphabetic character, or a numeric character, or a symbol, or a combination thereof, and wherein the clock face keyboard provides at least twenty four keys for alphabetic characters comprising a complete alphabet; whereby the twenty four switches of the inner and outer concentric circles and the at least two switches of the central switch provide for at least the twenty six characters.

The clock face keyboard may have the switches of the first and second sets of switches that are adjacent each other on the radial of the same hour of the clock face geometry each comprise a two-way rocker switch.

The clock face keyboard may provide an alphanumeric keyboard for letters of the English alphabet, wherein 22 of the 26 English alphabet letters are on the inner and outer concentric circles from the one o'clock to the eleven o'clock positions, and wherein the remaining four of the 26 English alphabet letters are on a central switch located near the geometric center of the inner and outer concentric circles of twelve switches, the remaining four letters being in three o'clock, six o'clock, nine o'clock, and twelve o'clock positions of the central switch.

The clock face keyboard may have numerals from "0" to "9" and "*" and "#" symbols that are located on one of the inner and outer concentric circles substantially following the layout of a clock face from the twelve o'clock position to the eleven o'clock position in clockwise order.

The clock face keyboard may provide an alphanumeric keyboard for letters of the English alphabet placed substantially following the traditional QWERTY keyboard, wherein each row of English alphabet letters thereof or each adjacent pair of English alphabet letters thereof is folded into keys of the inner and outer concentric circles and of a central switch located near the geometric center of the inner and outer concentric circles of twelve switches, and wherein the numerals from "0" to "9" and "*" and "#" symbols are on keys of the inner and outer concentric circles from the eleven o'clock position to the one o'clock position and from the five o'clock position to the seven o'clock position substantially following the layout of the numeric key pad of the QWERTY keyboard or of a telephone.

The clock face keyboard may provide an alphanumeric keyboard for symbols of the Korean Hangeul alphabet, wherein the fourteen consonant symbols of the Korean Hangeul alphabet are on keys of the inner and outer concentric circles substantially from the six o'clock position to the twelve o'clock position, and wherein the remaining ten vowel symbols of the Korean Hangeul alphabet are on keys of the inner and outer concentric circles substantially from the one o'clock position to the five o'clock position.

A clock face keyboard may provide at least twenty six keys for alphabetic characters and for numeric characters, said clock face keyboard comprising: first and second sets of twelve switches arranged in respective concentric circles, an inner concentric circle thereof consisting of the twelve switches of the first set of twelve switches and an outer concentric circle thereof consisting of the twelve switches of the second set of twelve switches, wherein the twelve switches of each of the inner and outer concentric circles are arranged in a configuration that substantially follows the radial geometry of a clock face having the twelve switches arranged at a 30 degree angular spacing in positions from a one o'clock position to a twelve o'clock position with one switch of each of the inner and outer concentric circles on each hourly radial, a central switch located near the geometric center of the inner and outer concentric circles of twelve switches for providing at least two switches; whereby the twenty four switches of the inner and outer concentric circles of switches and the at least two switches of the central switch provide for at least the twenty six characters; wherein the inner and outer concentric circles of twelve switches are situated within a tangential square defining four corners between the outer concentric circle of switches and the tangential square; at least two additional switches each located at a respective one of the corners defined between the outer concentric circle of switches and the tangential square, each of said additional switches being for changing a function of switches of the twenty four switches of the inner and outer concentric circles of switches and the at least two switches of the central switch; first and second sets of twelve keys arranged on the inner and outer concentric circles, each key thereof being associated with a respective switch of the first and second sets of twelve switches for being pressed for actuating the respective switch of the first and second sets of twelve switches; at least two keys located near the geometric center of the inner and outer concentric circles, each being associated with a respective one of the at least two switches of said central switch; at least two additional keys, each being associated with a respective one of the at least two switches located at the corners defined between the outer concentric circle of switches and the tangential square; wherein each key of the first and second sets of twelve keys and each key of the at least two keys and each key of the at least two additional keys has a surface for receiving an indicia of an alphabetic character, or a numeric character, or a symbol, or a combination thereof, and wherein the clock face keyboard provides at least twenty four keys for alphabetic characters comprising a complete alphabet; whereby the at least two additional switches multiply the functions of the twenty four switches of the inner and outer concentric circles and of the at least two switches of the central switch to provide for at least the twenty six characters and numeric characters.

The clock face keyboard may have the switches of the first and second sets of switches that are adjacent to each other on the radial of the same hour of the clock face geometry each comprise a two-way rocker switch.

The clock face keyboard may provide an alphanumeric keyboard for letters of the English alphabet, wherein 22 of the 26 English alphabet letters are on the inner and outer concentric circles from the one o'clock to the eleven o'clock positions, and wherein the remaining four of the 26 English alphabet letters are on a central switch located near the geometric center of the inner and outer concentric circles of twelve switches, the remaining four letters being in three o'clock, six o'clock, nine o'clock, and twelve o'clock positions of the central switch.

The clock face keyboard may have numerals from "0" to "9" and "*" and "#" symbols that are located on one of the inner and outer concentric circles substantially following the layout of a clock face from the twelve o'clock position to the eleven o'clock position in clockwise order.

The clock face keyboard may provide an alphanumeric keyboard for letters of the English alphabet placed substantially following the traditional QWERTY keyboard, wherein each row of English alphabet letters thereof or each adjacent pair of English alphabet letters thereof is folded into keys of the inner and outer concentric circles and of a central switch located near the geometric center of the inner and outer concentric circles of twelve switches, and wherein the numerals from "0" to "9" and "*" and "#" symbols are on keys of the inner and outer concentric circles from the eleven o'clock position to the one o'clock position and from the five o'clock position to the seven o'clock position substantially following the layout of the numeric key pad of the QWERTY keyboard or of a telephone.

The clock face keyboard may provide an alphanumeric keyboard for symbols of the Korean Hangeul alphabet, wherein the fourteen consonant symbols of the Korean Hangeul alphabet are on keys of the inner and outer concentric circles substantially from the six o'clock position to the twelve o'clock position, and wherein the remaining ten vowel symbols of the Korean Hangeul alphabet are on keys of the inner and outer concentric circles substantially from the one o'clock position to the five o'clock position.

I claim:

1. A compact alphanumeric keyboard providing the clock face familiarity for ease of learning and ease of use, comprising: at least twenty eight alphanumeric keys, where the twenty-eight alphanumeric keys are arranged in a first set of twelve alphanumeric keys, a second set of twelve alphanumeric keys, and a third set of four alphanumeric keys, where the first set and second set of keys are arranged to correspond with positions of a set of twelve hours on a clock face, where the third set of keys is arranged to correspond with positions of zero hour, three hour, six hour, and nine hour on the clock face, where the first set, second set, and third set of keys are concentric with respect to a center, where the first set of keys is bounded by a first circle outer boundary and a second circle inner boundary, the second set of keys is bounded by the second circle outer boundary and a third circle inner boundary, and the third set of keys is bounded by the third circle, where the ratio of the radii of the first circle, second circle, and third circle is substantially the square root of 7 to 2 to 1; wherein each key of the first set and second set of keys has a respective key area having a substantially annular sector shape, and each key of the third set of keys has a respective key area having a substantially circular sector shape, each of the plurality of key areas being substantially of equal area and contiguous to the immediately adjacent key areas; and each of the at least twenty-eight alphanumeric keys having an indicia surface within the corresponding apportioned key area for being comfortably pressed by a finger.

2. The compact alphanumeric keyboard of claim 1:
wherein the indicia surface of at least one of the twenty-eight alphanumeric keys has a tactile means for revealing the hour of the key's hourly radial position.

3. The compact alphanumeric keyboard of claim 2:
wherein the tactile means is a concavity on the indicia surface in the circumferential direction,
wherein the tactile means tends to guide the finger to the circumferential middle of the indicia surface hence tends to promote accurate typing, and
whereby the user tends to find the key for an alphanumeric letter by the key's hourly radial position without visual contact.

4. The compact alphanumeric keyboard of claim 1, wherein the keys of the first set and second set that are adjacent to each other on the radial of the same hour of the clock face each comprise a two-way rocker switch.

5. The compact alphanumeric keyboard of claim 1 wherein the four alphanumeric keys of the third set comprise a multi-directional rocker key.

6. The compact alphanumeric keyboard of claim 1, further comprising four corner keys situated outside the twenty-eight alphanumeric keys and at four corners within a square tangentially surrounding the twenty-eight alphanumeric keys.

7. The compact alphanumeric keyboard of claim 1, further comprising at least one external key having functional means to multiply the number of key functions of the twenty-eight alphanumeric keys.

8. The compact alphanumeric keyboard of claim 1, wherein the ten alphabet letters of the top row of a QWERTY keyboard are assigned substantially in the same sequence to ten of the eleven top positions of the twenty-eight alphanumeric keys including the ten hour, eleven hour, zero hour, one hour, and two hour positions of the first set and second set, and the zero hour position of the third set, wherein the seven alphabet letters of the bottom row of a QWERTY keyboard are assigned substantially in the same sequence to seven of the eight bottom positions of the twenty-eight alphanumeric keys including the five hour, six hour, and seven hour positions of the first set and second set, and the four hour and eight hour positions of the first set, wherein the nine alphabet letters of the middle row of a QWERTY keyboard are assigned substantially in the same sequence to nine of the nine remaining middle positions of the twenty-eight alphanumeric keys including the three hour and nine hour positions of the first set and second set, the four hour and eight hour positions of the second set, and the three hour, six hour, and nine hour positions of the third set, whereby a QWERTY keyboard familiarity is added to the clock face familiarity for further ease of learning and ease of use.

9. The compact alphanumeric keyboard of claim 1, wherein the twenty six English alphabet letters are laid out in a clockwise direction, at least the first twenty two assigned to the alphanumeric keys of the first set and second set in a predetermined alternating sequence and the remaining letters to the alphanumeric keys of the third set, whereby a directional familiarity is added to the clock face familiarity for further ease of learning and ease of use.

10. The compact alphanumeric keyboard of claim 1, wherein the numerals from "0" to "9" and "*" and "#" symbols are assigned to the eleven hour, twelve hour, one hour, seven hour, six hour, and five hour positions of the first set and second set in the same sequence as the numerals from "0" to "9" and "*" and "#" symbols on a telephone numeric keypad, whereby a telephone keypad familiarity is added to the clock face familiarity for further ease of learning and ease of use.

11. The compact alphanumeric keyboard of claim 1, wherein the numerals "0" to "9" and "*" and "#" symbols are assigned sequentially in the clockwise direction to zero hour to eleven hour positions of a predetermined set of the first set and second set, whereby a directional familiarity is added to the clock face familiarity for further ease of learning and ease of use.

12. A compact alphanumeric keyboard of substantially elliptical shape resulting from the compact alphanumeric keyboard of claim 1 when the compact alphanumeric keyboard of claim 1 is elongated uniformly in a predetermined direction by a predetermined ratio.

13. A compact alphanumeric keyboard providing the clock face familiarity for ease of learning and ease of use, comprising: at least twenty six alphanumeric keys, where the twenty-six alphanumeric keys are arranged in a first set of twelve alphanumeric keys, a second set of twelve alphanumeric keys, and a third set of two keys, where the first set and second set of keys are arranged to correspond with positions of a set of twelve hours on a clock face, where the third set of keys is arranged to correspond with two diagonal positions of a set of twelve hours on a clock face, where the first set, second set, and third set of keys are concentric with respect to a center, where the first set of keys is bounded by a first circle outer boundary and a second circle inner boundary, the second set of keys is bounded by the second circle outer boundary and a third circle inner boundary, and the third set of keys is bounded by the third circle, where the ratio of the radii of the first circle, second circle, and third circle is substantially the square root of 13 to the square root of 7 to 1; wherein each key of the first set and second set of keys has a respective key area having a substantially annular sector shape, and each key of the third set of keys has a respective key area having a substantially circular sector shape, each of the plurality of key areas being substantially of equal area and contiguous to the immediately adjacent key areas; and each of the at least twenty-six alphanumeric keys having an indicia surface within the corresponding apportioned key area for being comfortably pressed by a finger.

14. The compact alphanumeric keyboard of claim 13:
wherein the indicia surface of at least at least one of the at least twenty-six alphanumeric keys has a tactile means for revealing the hour of the key's hourly radial position.

15. The compact alphanumeric keyboard of claim 14:
wherein the tactile means is a concavity on the indicia surface in the circumferential direction,
wherein the tactile means tends to guide the finger to the circumferential middle of the indicia surface hence tends to promote accurate typing, and
whereby the user tends to find the key for an alphanumeric letter by the key's hourly radial position without visual contact.

16. A compact alphanumeric keyboard of substantially elliptical shape resulting from the compact alphanumeric keyboard of claim 13 when the compact alphanumeric keyboard of claim 13 is elongated uniformly in a predetermined direction by a predetermined ratio.

17. A compact alphanumeric keyboard providing the clock face familiarity for ease of learning and ease of use, comprising: at least twenty nine alphanumeric keys, where the twenty-nine alphanumeric keys are arranged in a first set of twelve alphanumeric keys, a second set of twelve alphanumeric keys, a third set of four alphanumeric keys, and a fourth set of one alphanumeric key, where the first set and second set of keys are arranged to correspond with positions of a set of twelve hours on a clock face, where the third set of keys is arranged to correspond with positions of zero hour, three hour, six hour, and nine hour on the clock face, where the first set, second set, and third set of keys are concentric with respect to a center, where the fourth set of keys is arranged to correspond with the center, where the first set of keys is bounded by a first circle outer boundary and a second circle inner boundary, the second set of keys is bounded by the second circle outer boundary and a third circle inner boundary, the third set of keys is bounded by the third circle outer boundary and a fourth circle inner boundary, and the fourth set of keys is bounded by the fourth circle, where the ratio of the radii of the first circle, second circle, third circle, and fourth circle is substantially the square root of 29 to the square root of 17 to the square root of 5 to 1; wherein each key of the first set, second set, and third set of keys has a respective key area having a substantially annular sector shape, and the key of the fourth set of keys has a respective key area having a substantially circular shape, each of the plurality of key areas being substantially of equal area and contiguous to the immediately adjacent key areas; and each of the at least twenty-nine alphanumeric keys having an indicia surface within the corresponding apportioned key area for being comfortably pressed by a finger.

18. The compact alphanumeric keyboard of claim 17:
wherein the indicia surface of at least one of the twenty-nine alphanumeric keys has a tactile means for revealing the hour of the key's hourly radial position.

19. The compact alphanumeric keyboard of claim 13:
wherein the tactile means is a concavity on the indicia surface in the circumferential direction,
wherein the tactile means tends to guide the finger to the circumferential middle of the indicia surface hence tends to promote accurate typing, and whereby the user tends to find the key for an alphanumeric letter by the key's hourly radial position without visual contact.

20. A compact alphanumeric keyboard of substantially elliptical shape resulting from the compact alphanumeric keyboard of claim 17 when the compact alphanumeric keyboard of claim 17 is elongated uniformly in a predetermined direction by a predetermined ratio.

* * * * *